April 1, 1969     A. A. SPANJERSBERG     3,436,010
AUTOMATIC PUNCHING DEVICE

Filed Dec. 16, 1963     Sheet 1 of 8

INVENTOR.
A. A. SPANJERSBERG
BY
ATTORNEY

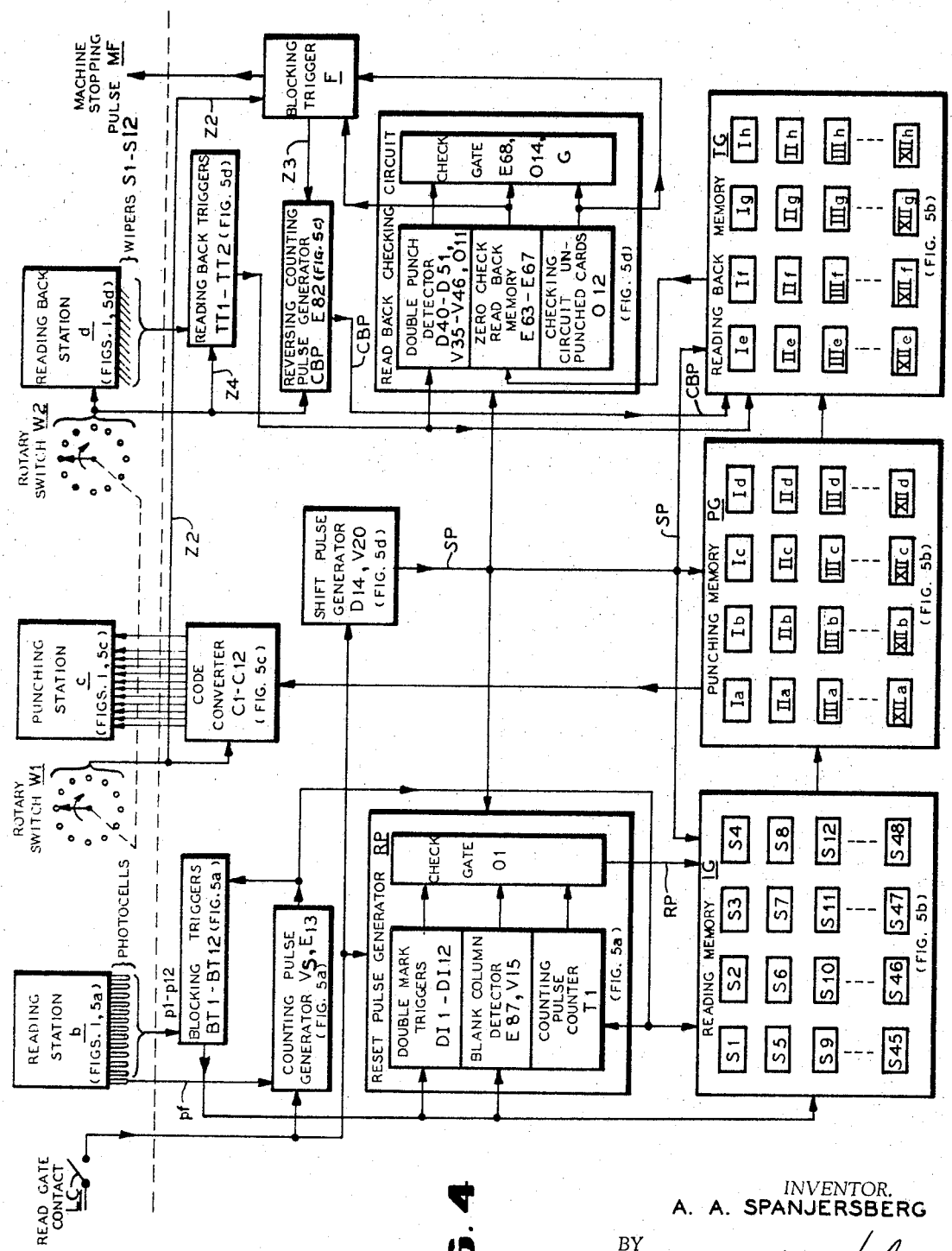

INVENTOR.
A. A. SPANJERSBERG

3,436,010
AUTOMATIC PUNCHING DEVICE
Arie Adriaan Spanjersberg, Leiderdorp, Netherlands, assignor to De Staat der Nederlanden, ten Deze Vertegenwoordigd Door de Directeur-Generaal der Posterijen Telegrafie en Telefonie, The Hauge, Netherlands
Filed Dec. 16, 1963, Ser. No. 330,824
Claims priority, application Netherlands, Dec. 21, 1962, 287,168
Int. Cl. G06k $1/04, 1/14, 1/00$
U.S. Cl. 234—34             13 Claims

ABSTRACT OF THE DISCLOSURE

An automatic card feeding, reading, punching, and reading-back device and the electronic control circuits therefor wherein the card is first read and checked to determine if it is marked properly or not, and if not it is not punched but fed on through the device. If the card is properly marked, its readings are stored and transferred to the control and code converter for punching the card in a code according to the read marks. If the card is not punched, an indication is also made thereof and used for controlling the device. Finally the punched holes in the card or the unpunched card are read back and checked against the stored marks or nonpunched indications to determine that the holes or unpunched cards are correct, and if not the device is stopped.

RELATED APPLICATIONS

Priority base Netherlands application Ser. No. 287,168 filed Dec. 21, 1962.

BACKGROUND OF THE INVENTION

Automatic punching devices for reading and then punching information in punched cards are known. The Bull automatic punching device is also provided with a second reading station, which, however, only serves to check whether one hole has been punched or not in each column.

SUMMARY OF THE INVENTION

The invention relates to an automatic punching device for reading, by means of a reading station, information recorded as code signals in printing positions or in marking posistions in marking columns on punched cards, which information, after having been checked by a checking circuit and found correctly printed or marked is converted by the punching device into holes punched in the card in positions corresponding to the printed code signals or to the marked positions in the marking columns. These punchings, however, are blocked in the case a card is found which is incorrectly printed or marked. This punching device is further provided with a second reading station and a checking circuit, by means of which a card is determined to be correctly printed or marked, by comparing the positions and the number of the punched holes with the stored information from the first reading station. This checking circuit also determines if a card is found incorrectly printed or marked, and whether any holes at all have been punched into it.

The present invention provides a device allowing a complete comparison of the information punched and the information observed by the first reading station.

BRIEF DESCRIPTION OF THE DRAWINGS

FIG. 4 is a schematic block diagram of the electronic control circuits for the last three stations shown in FIG. 1;

FIGS. 5a through 5d together show a schematic block and wiring diagram of the electronic control and checking circuits for a device according to that shown in FIGS. 1 and 4, wherein FIG. 5a is of the first reading and mark checking circuits, FIG. 5b is of the memory circuits, FIG. 5c is of the punching magnet and code converter circuits, and FIG. 5d is the reading back and hole checking circuits.

Figure 1:
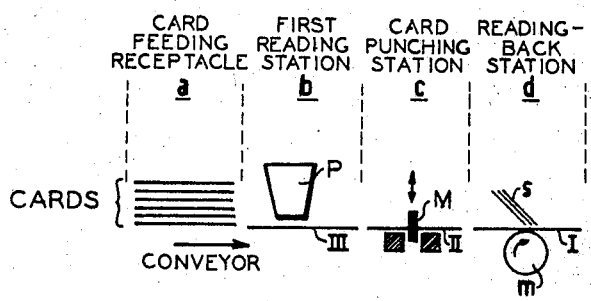
FIG. 1 is a schematic diagram of the four stations of the card punching device of this invention, namely card feeding receptacle $a$, first reading station $b$, card punching station $c$, and reading back and checking station $d$.
Figure 2:
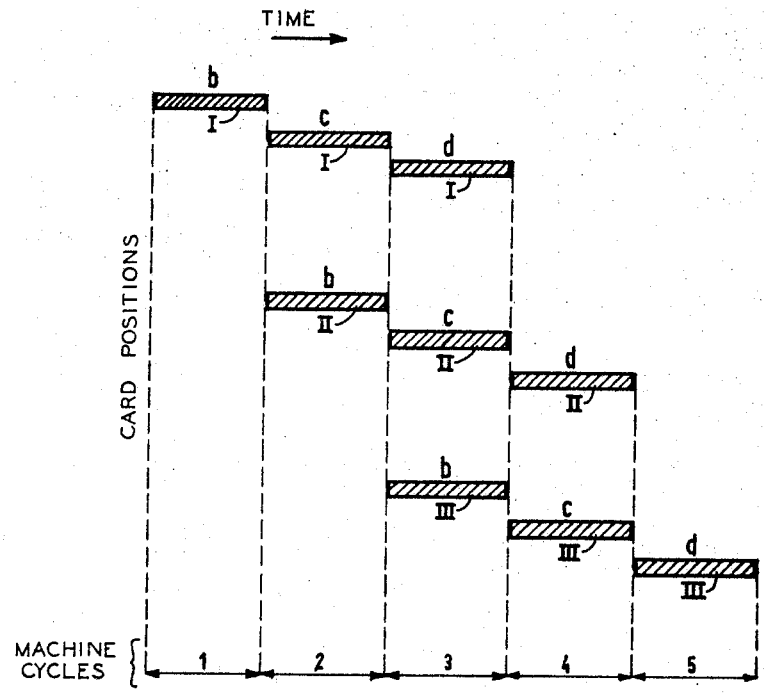
FIG. 2 is a schematic time and five position or cycle diagram for three cards passing through the stations shown in FIG. 1.

DETAILED DESCRIPTION OF A PREFERRED EMBODIMENT (A) Mechanical operation (1) The stations (FIGS. 1, 2 and 4)

FIG. 1 shows schematically the mechanical part and stations of the punching device. The cards to be punched are stacked in the feeding receptacle $a$. By means of a device not shown in this figure, the bottom card is taken from the receptacle and put on a conveyor belt. First the card moves past the first reading station $b$, by means of which the information is read from the printing positions or from the marking columns on the card. Then the card comes under the punching station $c$, where this read information is punched in it by means of punches actuated by electromagnets.

In the described example it is supposed that the punching station contains one punch for each column. The moment of energization of an electromagnet actuating a punch, determines in which position a hole will be punched. After having passed the punching station $b$ the card reaches the reading-back station $d$. This reading-back station may consist of a metal roller $m$ and a number of metal wipers $s$. There is a wiper for each punched column. If there is a punched hole of a card under a wiper, there is an electrical contact between the metal roller $m$ and that wipers.

The distances between the first reading station $b$, the punching station $c$ and the reading-back station $d$ are such that there are always three cards being handled simultaneously, when the punching device is in operation. In FIG. 1 these cards are designated by I, II and III; each of these cards undergoes a different partial treatment. The information of the card I, read by the reading station $b$, must be stored and be available until that card has passed the wipers of the reading-back station $d$. Accordingly, the punching device must be provided with a memory allowing the storage of the information of three cards. The memory consists of three parts: the reading memory IG, the punching memory PG, and the reading-back memory TG and these three parts of the memory are coupled together as shift registers (see FIGS. 4 and 5b).

FIG. 2 shows diagrammatically some successive machine cycles 1 through 5 for the partial treatments of the cards I, II, III. The partial treatments are designated by the letters $b$, $c$ and $d$ used in FIG. 1 for the relevant equipment or stations. The position of the cards as shown in FIG. 1 corresponds to the third machine cycle.

(A–2) Electronic memories (FIGS. 4 and 5)

At the start of every machine cycle the reading memory is cleared. Then the information contained in the marking columns of the card to be read is stored in the reading memory IG by means of the reading station $b$. At the end of the reading period a checking circuit DMC checks whether all the code signals are valid and whether in each marking column one mark has been observed. Of a card found correctly marked, the information read remains in the reading memory IG until the end of the machine cycle. At that moment a shift pulse SP (see FIGS. 5a, 5b, and 6) is formed, by means of which the whole content of information of the reading memory IG is transferred to the punching memory, PG and the information remains there for the duration of the next machine cycle. The punching memory PG is scanned during this cycle by means of a rotary switch W1 (see FIGS. 4 and 5c), the wiper of which rotates synchronously with the punching positions of the card appearing under the punches. During this scanning, the information contained in that punching memory PG is punched in punching code in the card. At the end of this machine cycle, the shift pulse SP is formed again, which transfers the information from the punching memory PG to the reading-back memory TG. Then in the next machine cycle, the information contained in the reading-back memory TG is compared with the code punched in the card.

Thus during the transport of a card to a next handling station, the corresponding information is transferred to a next part of the memory, so that a transfer of information is effected at every change of cycle.

Figure 5A:
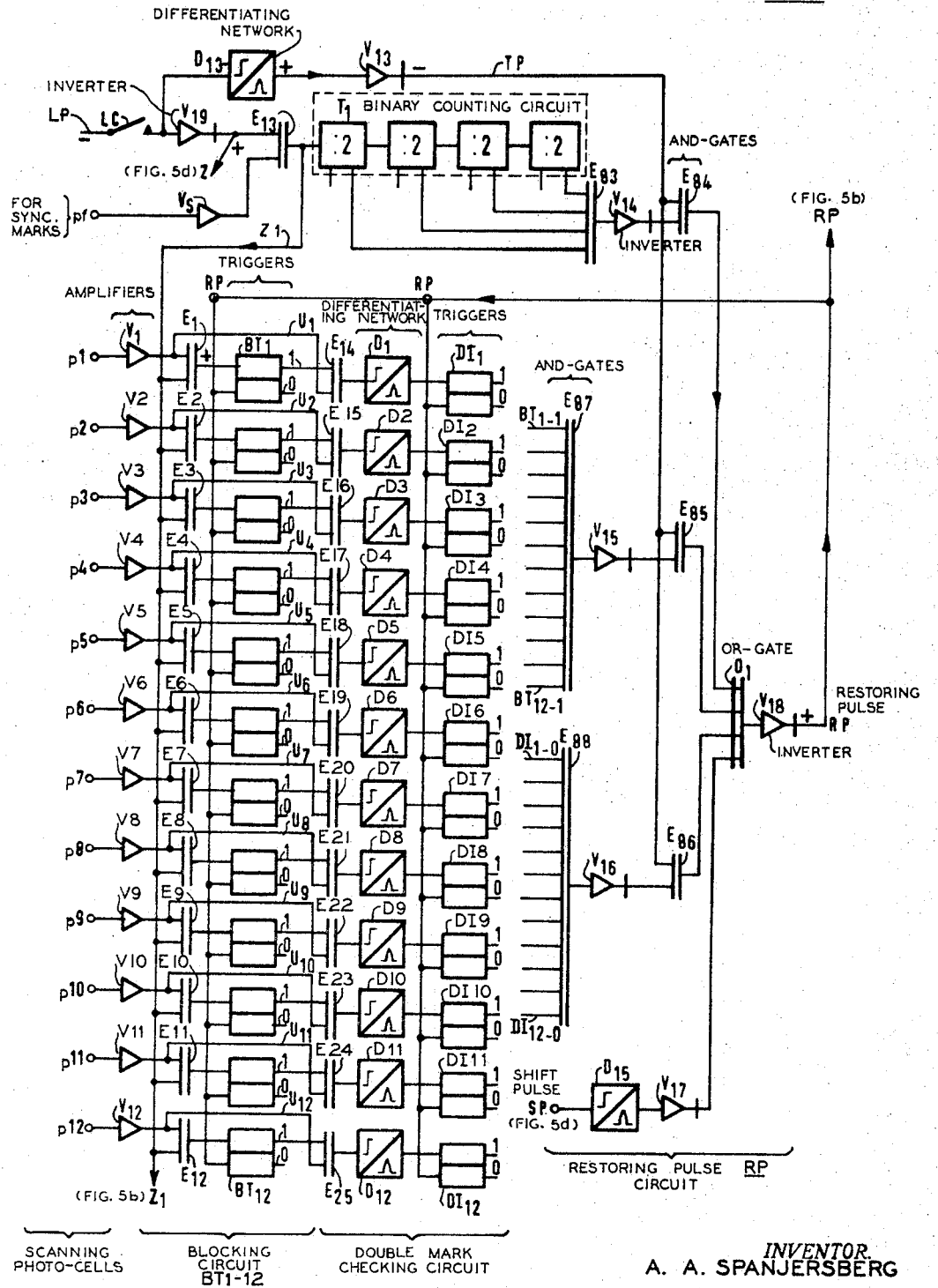
Figure 5B:
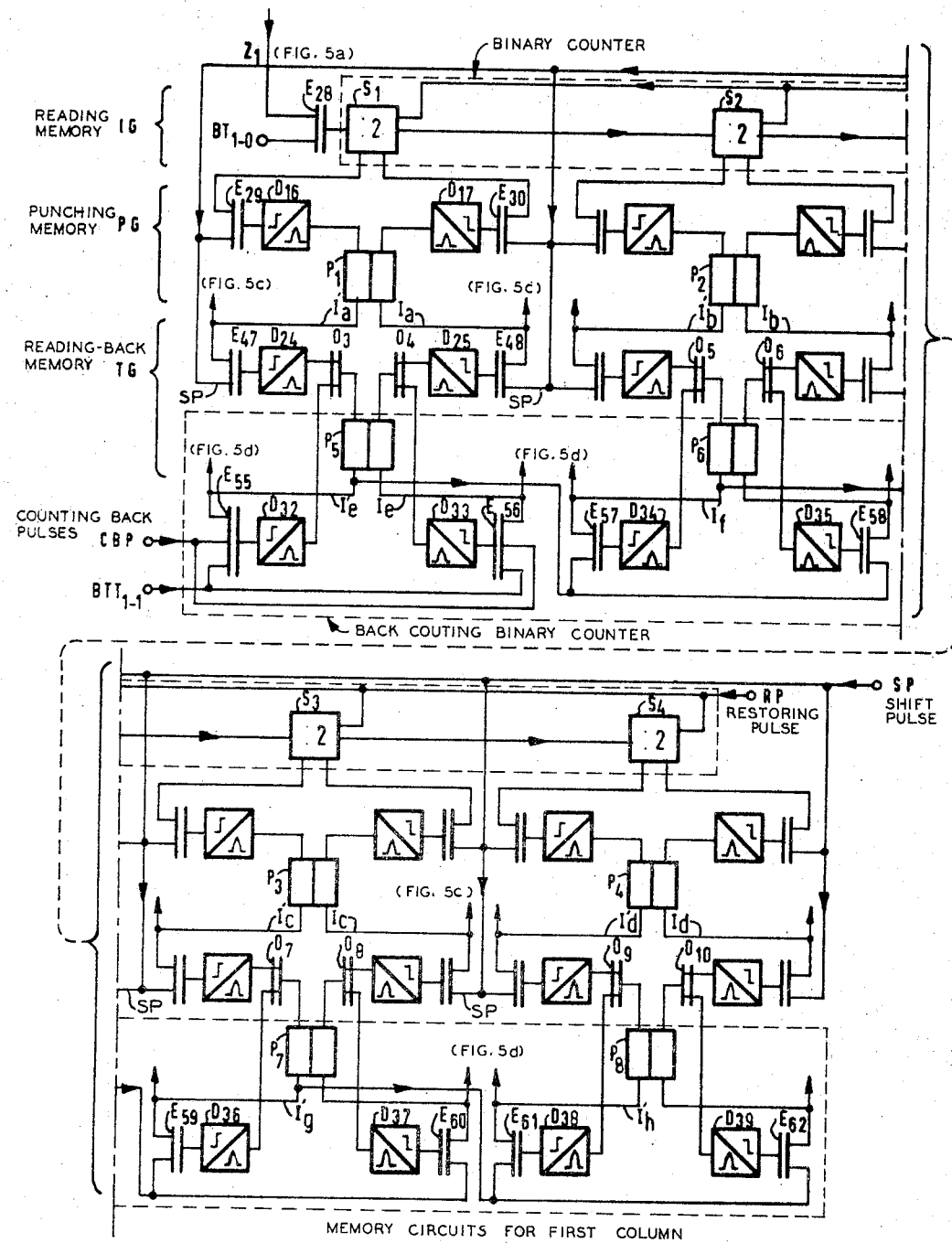

If the code signals or the marking columns of a card are found to be incorrectly printed or marked by the first reading circuit associated with the reading station $b$, the reading memory IG is restored to the normal state by means of a reset or restoring pulse RP (see FIGS. 4, 5a, and 5b before the shift pulse SP appears. The shift pulse SP then formed restores the punching memory PG to the normal state, as a result of which no holes will be punched in the card. In the machine cycle then following, the reading-back memory TG is restored to the normal state and it is checked to see if any holes have been punched in the card.

If during the reading-back period an inequality is found between the information contained in the reading-back memory and the holes or no holes punched, the whole punching device or machine of this invention can be stopped automatically and a signalling lamp indicates that a machine error has occurred.

Figure 3:
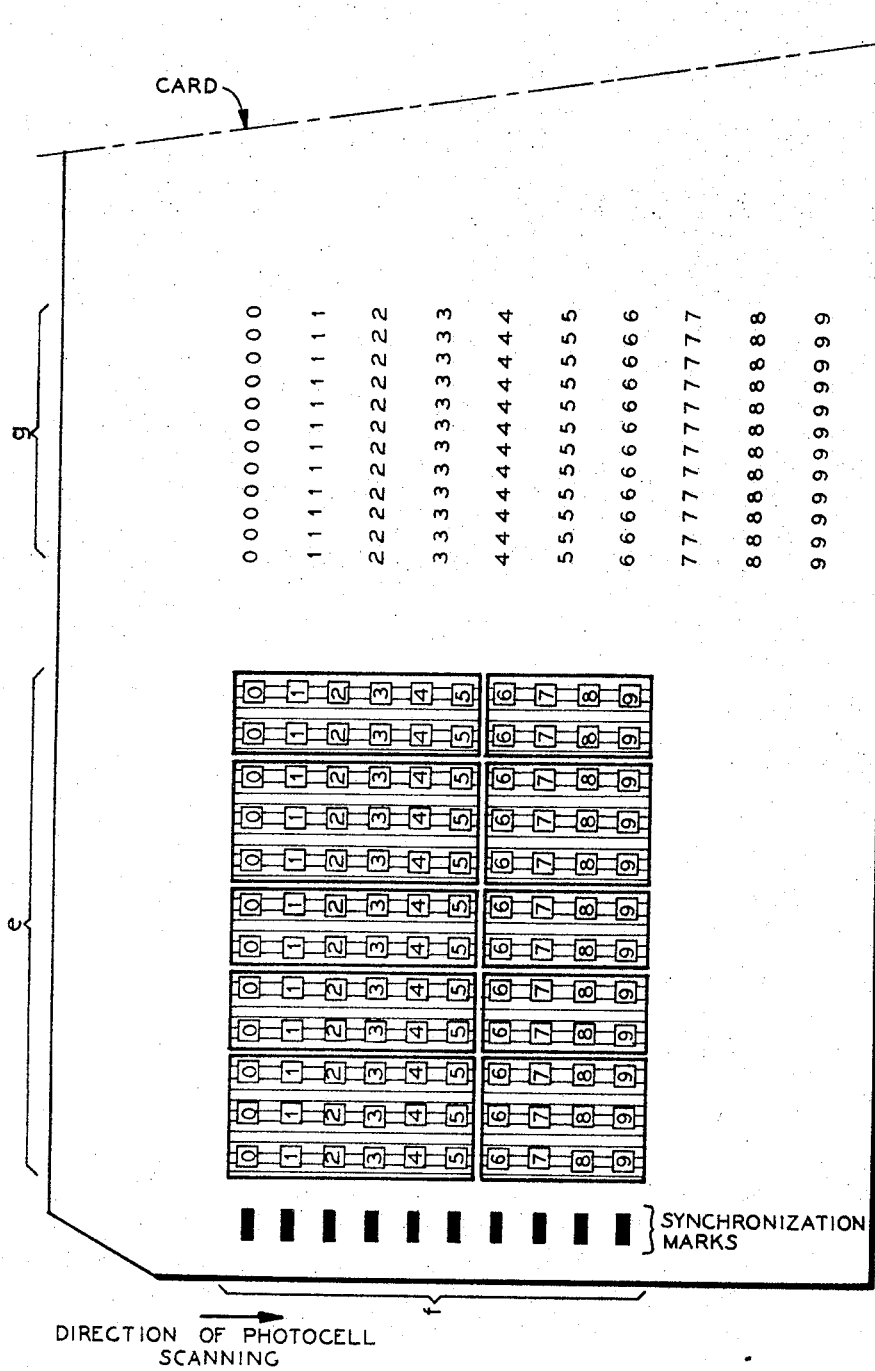
FIG. 3 is a portion of one type of a card which may be processed by the device of FIG. 1 showing the darkened marking area $e$ and a numbered punching area $g$.

(A–3) The card (FIG. 3)

FIG. 3 exemplifies a punched card provided with marking columns $e$. These marking columns may be scanned by means of photocells $p$ (see FIG. 1). The color of the darkened area in which the marking positions are indicated cannot be detected by the photocells. For example, if germanium or silicon photocells are used, the marking positions and darkened area are printed in red and the marks to be read then must be applied thereto in a different colour, in order that they can be detected.

The stripes $f$ at the left side of the marking position area, indicate the positions or rows in which the marks are applied. These stripes $f$ are printed in a colour that can be detected by the photocells, e.g. black and will be referred to as synchronization marks. During the scanning, each marking column is scanned by a photocell. There is also a photocell for scanning the column of synchronization marks $f$. The scanning takes place in a vertical direction, notably from above to below as seen on the card of FIG. 3. This scanning method has already been described in applicant's joint U.S. patent application Ser. No. 82,495 filed Jan. 13, 1961, now abandoned and its continuation-in-part application Ser. No. 431,926, filed Feb. 11, 1965. The information read is punched in the punching columns $g$. The number of marking columns is equal to the number of punching columns herein shown to be twelve.

(B) Electronic control circuits (1) First Reading Circuit (FIGS. 4, 5a, 5b, and 6)

In FIG. 5a the input terminals of the amplifiers $V_1$ to $V_{12}$ are connected to the photocells $p1$ through $p12$ by means of which the twelve marking columns $e$ of a card are scanned. The input terminal of the amplifier $V_s$ is connected to the photocell $pf$ by means of which the synchronization stripes of the column $f$ are scanned. The output terminals $U_1$ through $U_{12}$ of the amplifiers $V_1$ through $V_{12}$ are connected to the input terminals of the AND-gates $E_1$ through $E_{12}$ working with positive polarity. The other input terminals of these AND-gates $E_1$ through $E_{12}$ are connected to the output terminal of a circuit delivering the synchronizing counting pulses $Z_1$. The counting pulses $Z_1$ constitute the output signal of the AND-gate $E_{13}$, which operates with positive polarity, and whose input terminal is connected to the output terminal of the amplifier $V_s$ controlled by the synchronization marks $f$. The other input terminal of the AND-gate $E_{13}$ is supplied, via the inverting amplifier V19, from the reading gate or scanning column signal LP (FIG. 5). This reading gate signal LP is obtained by means of a switch LC, which is closed during the scanning of the marking columns of a card. Thus possible blots occurring in other places than in the marking columns are prevented from influencing the scanning.

(B–1–a) Double mark checking circuits

Each of the AND-gates $E_1$ through $E_{12}$ will deliver a pulse at its output terminal, if the corresponding amplifier $V_1$ through $V_{12}$ delivers a positive pulse in coincidence with a counting pulse Z1. An output pulse appearing at one of the AND-gates $E_1$ through $E_{12}$ changes over its associated blocking trigger $BT_1$ through $BT_{12}$. The output terminals $U_1$ through $U_{12}$ are also connected to the AND-gates $E_{14}$ through $E_{25}$ working at negative polarity. The output terminals 1 of the corresponding blocking triggers $BT_1$ through $BT_{12}$ are connected to the input terminals of the AND-gates $E_{14}$ through $E_{25}$ as well. The output terminal $BT_{1-1}$, which is connected to the AND-gate $E_{14}$, assumes the negative polarity, when the blocking trigger $BT_1$ has been changed over. If there is another mark in the first marking column of the card, another positive pulse will appear at the output terminal $U_1$. As the output terminal $BT_{1-1}$ of the blocking trigger became negative already at the first pulse, there will then appear a positive pulse at the output terminal of the AND-gate $E_{14}$, which positive pulse via a differentiating network $D_1$, changes over the trigger $DI_1$. Similar differentiating or shaping networks $D_2$ through $D_{12}$ and triggers $DI_2$ through $DI_{12}$ have been provided for the other columns and photocells $f_2$ through $f_{12}$.

In the case of a correctly completed card, all the blocking triggers $BT_1$ through $BT_{12}$, and none of the triggers $DI_1$ through $DI_{12}$ have been changed over at the end of the reading period. This is checked by means of the testing pulse in conductor TP. The testing pulse is obtained by means of the differentiating network $D_{13}$ and the inverting amplifier $V_{13}$ from the trailing edge of the reading gate pulse LP through switch LC. Moreover, at the end of the reading period when the testing pulse is formed, ten synchronizing stripes $b$ must have been observed. For that purpose these ten counting pulses are applied to a binary counting circuit $T_1$ consisting of four triggers: 2. The AND-gate $E_{83}$ has a negative polarity, if the counting circuit $T_1$ is in the state 10. Via the inverting amplifier $V_{14}$, this signal is applied to the AND-gate $E_{84}$ operating with negative polarity.

The output terminals 1 of the blocking triggers $BT_1$ through $BT_{12}$ are connected to the input terminals of the AND-gate $E_{87}$ operating with negative polarity. If all the blocking triggers $BT_1$ through $BT_{12}$ have been changed over, the output terminal of the AND-gate $E_{87}$ has negative polarity. Via the inverting amplifier $V_{15}$ this signal reaches the AND-gate $E_{85}$, which operates with negative polarity. The other input terminal of the AND-gate $E_{85}$ is supplied with the test pulse TP.

The output terminals 0 of the triggers $DI_1$ through $DI_{12}$ are connected to the input terminals of the AND-gate $E_{88}$ operating with negative polarity. If none of the triggers $DI_1$—$DI_{12}$ have been changed over, the output terminal of the AND-gate $E_{88}$ has negative polarity. Via the inverting amplifier $V_{16}$ this signal reaches the AND-gate $E_{86}$ operating with negative polarity. The other input terminal of the AND-gate $E_{86}$ is also supplied with the test pulse.

Figure 6:
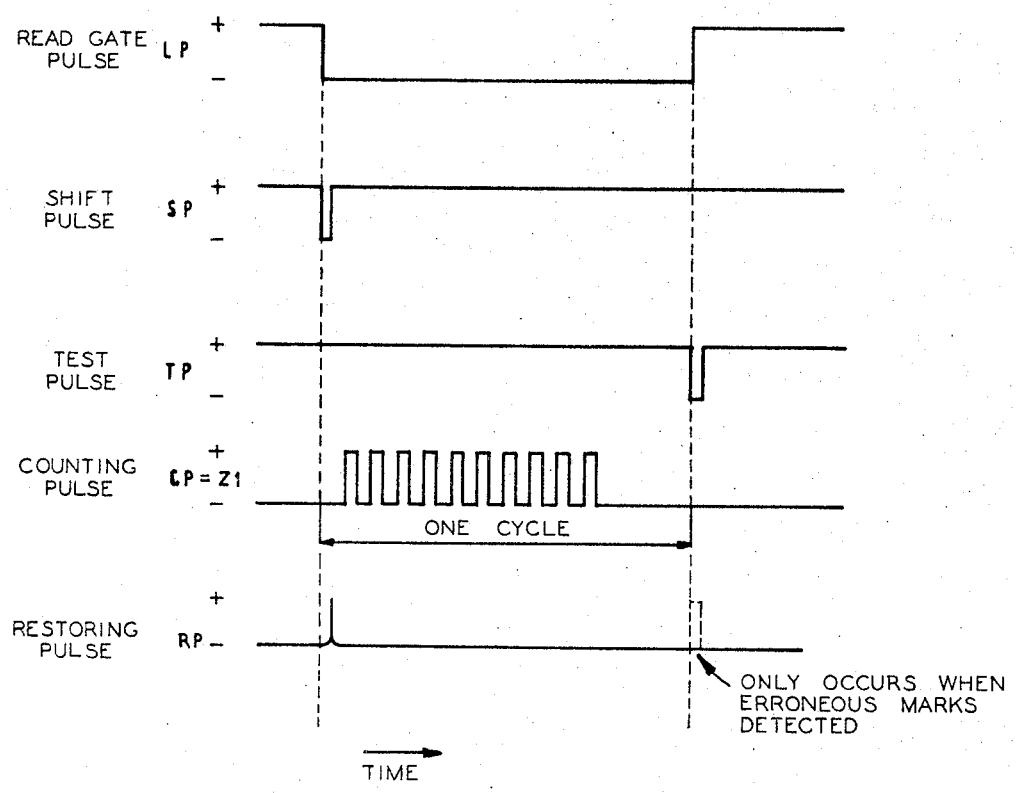
FIG. 6 is a wave form time diagram of reading gate, shift, test, counting, and restoring pulses generated in the circuits shown in FIGS. 4 and 5a through 5d.

If during the occurrence of the test pulse, TP any one of the following conditions are not fulfilled: that (a) the counting circuit $T_1$ is in state 10, that (b) all the blocking triggers $BT_1$ through $BT_{12}$ have changed over, and that (c) through none of the triggers $DI_1$ through $DI_{12}$ have been changed over; then the output terminal of at least one AND-gate $E_{84}$, $E_{85}$ or $E_{86}$ will have a negative polarity and a restoring pulse RP will be generated (see FIG. 6). The output terminals of the AND-gates $E_{84}$, $E_{85}$ and $E_{86}$ are connected to the OR-gate $O_1$, which works with negative polarity. So if during the occurrence of the test pulse TP one or more of the said conditions are not fulfilled, the output terminal of the OR-gate $O_1$ has negative polarity. In that case the output terminal of the inverting amplifier $V_{18}$ has positive polarity during the occurrence of the test pulse. This signal constitutes the resorting pulse RP (see FIG. 6), by means of which the blocking triggers $BT_1$ through $BT_{12}$ and the triggers $DI_1$—$DI_{12}$ are restored to the normal state.

The reading-gate signal LP is also applied via the inverting amplifier $V_{19}$ to the pulse shaping network $D_{14}$ (FIG. 5d), at the output terminal of which there appears a pulse of positive polarity at the leading edge of the reading-gate pulse. The output terminal of $D_{14}$ is connected to the input terminal of the inverting amplifier $V_{20}$, at the output terminal of which appears the shift pulse SP (see FIG. 6), which has negative polarity. This shift pulse SP is applied to the pulse shaping network $D_{15}$ (FIG. 5a), at the output terminal of which there appears, at the end of the shift pulse SP, a pulse having positive polarity. Via the inverting amplifier $V_{17}$ this pulse is supplied to the OR-gate $O_1$. Thus the shift pulse is formed at the beginning of each reading-gate pulse LP, and a restoring pulse RP is also produced then via $D_{15}$, $V_{17}$, $O_1$ and $V_{18}$. If at the end of the reading-gate pulse LP, so during the test pulse TP, the verifying circuits connected to the AND-gate $E_{84}$, $E_{85}$ or $E_{86}$ indicate by their states that the conditions for a correct filling-in are satisfied, no further restoring pulse RP is formed at the end of the reading-gate pulse LP. If, however, the conditions for a correct-filling-in are not satisfied, an additional restoring pulse RP is formed via the AND-gate $E_{85}$ or $E_{86}$, the OR-gate $O_1$, and the inverting amplifier $V_{18}$ at the time of and for the duration of the test pulse, see dotted line pulse RP in FIG. 6.

Thus FIG. 6 shows as a function of time the reading-gate pulse LP, the shift pulse SP, the test pulse TP, the counting pulses CP, and the restoring pulses RP in a single cycle.

(B-1-b) First reading memory circuit (FIG. 5b)

The memories shown in FIGS. 4 and 5b are intended to contain the information of the first marking columns of the three cards I, II, and III in the punching device. The memories for the information of the other eleven marking columns are of an analogous construction and therefore are not shown for the purposes of simplifying the drawings and avoiding unnecessary duplications.

The reading memory consists of the binary position triggers $S_1$ through $S_4$, which are connected as a binary counter. The input terminal of the first trigger $S_1$ is connected to the output terminal of the AND-gate $E_{28}$ operating with negative polarity. An input terminal of the AND-gate $E_{28}$ is connected to the output terminal $BT_{1-0}$ of the blocking trigger $BT_1$. The counting pulses CP or Z1 are supplied to the other input terminal of AND-gate $E_{28}$. The output terminal $BT_{1-0}$ has negative polarity, if the blocking trigger $BT_1$ is in the normal condition. Thus during the time when $BT_1$ is at normal, the counting pulses are successively applied via the AND-gate $E_{28}$ to the trigger $S_1$ and are counted in the binary triggers of the counter $S_1$ through $S_4$. However, when a photocell, for example photocell $p_1$, the output terminal of which is connected to the amplifier $V_1$, detects a mark in a marking position on a card, the blocking trigger $BT_1$ is changed over. Then output terminal $BT_{1-0}$ assumes positive polarity and thereafter the output terminal of the AND-gate $E_{28}$, which operates with negative polarity, can no longer assume negative polarity and the reading memory of the column 1 is blocked at that count or number.

Thus, if in the first marking column the marking position designated by "0" is marked, one counting pulse is applied to the reading memory of the column 1. So the numerical value of the binarily coded information in the reading memory, IG or counter $S_1$ through $S_4$ at the end of the reading-gate pulse is equal to the numerical value of the marked marking position on the card, increased by 1.

In the case of a card found not correctly marked, an additional restoring pulse RP appears at the end of the reading-gate pulse LP, by means of which all the reading memories $S_1$ through $S_4$ are restored to normal. In the case of a card found correctly marked the restoring pulse does not appear at the end of the reading-gate pulse and the information remains stored in the reading memory IG until after the beginning of the next reading-gate pulse LP. At the leading edge of that next reading-gate pulse there appears a shift pulse SP by means of which the information contained in the reading memory IG is transferred to the corresponding punching memory PG. Then at the trailing edge of the shift pulse SP there appears the normal restoring pulse RP (see FIG. 6), by means of which the reading memory IG is then restored to normal after the transfer of its count has been made to the punching memory PG.

Figure 5C:
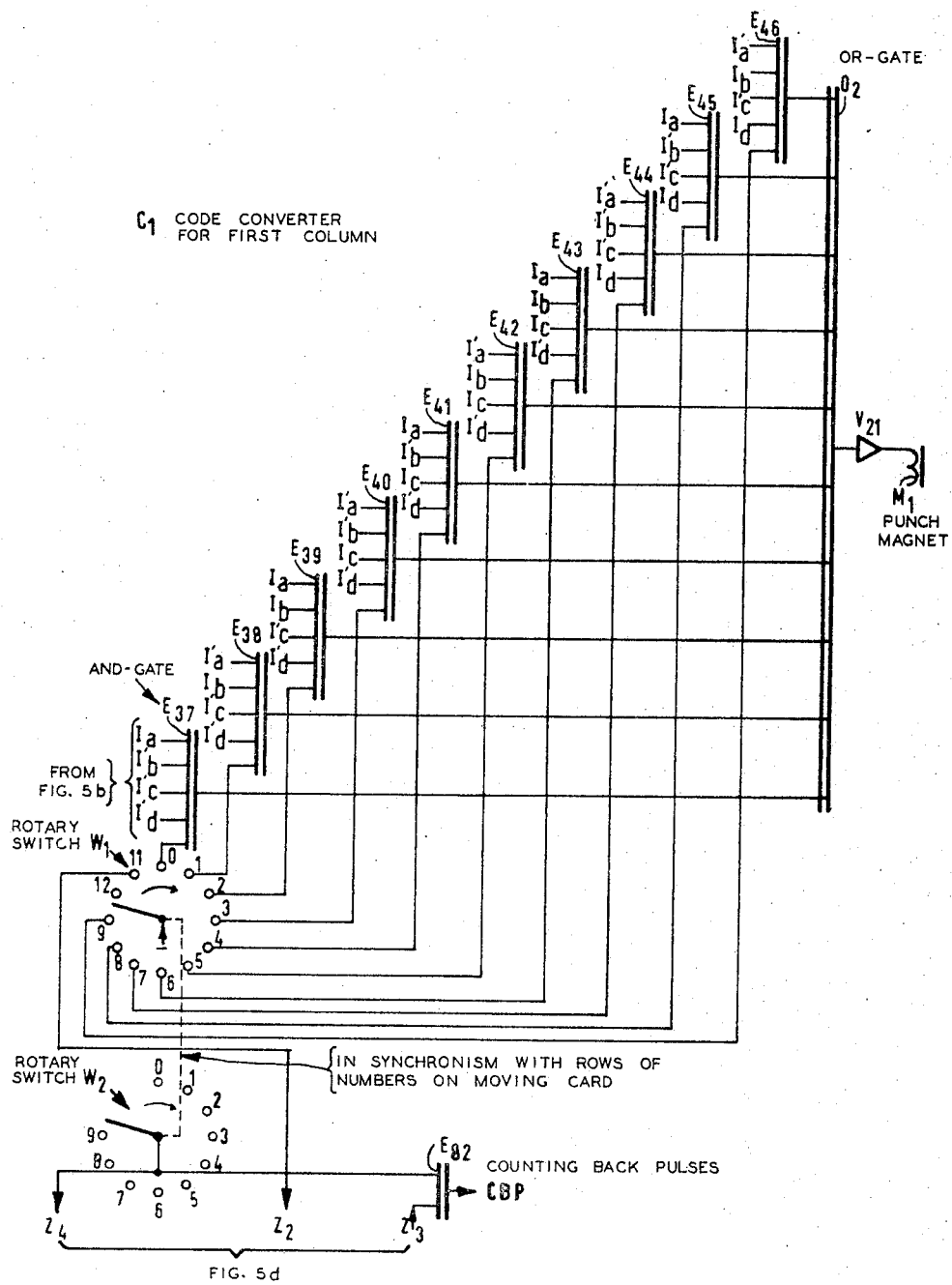

(B-2) Punching control circuit (FIGS. 4, 5b, and 5c)

In the example of a mark in the "0" position of the first column as stated and recorded above in trigger $S_1$ of the first reading memory IG, the output terminals of the trigger $S_1$ are connected to the input terminals of the AND-gates $E_{29}$ and $E_{30}$ operating with negative polarity. The shift pulse SP is applied to the output terminals of AND-gates $E_{29}$ and $E_{30}$. The output terminals of the AND-gates $E_{29}$ and $E_{30}$ are connected via the pulse shaping networks $D_{16}$ and $D_{17}$ respectively, to the input terminals of the punching memory trigger $P_1$. The output terminals of the triggers $S_2$ through $S_4$ are connected in an analogous way to the input terminals of the punching memory triggers $P_2$, $P_3$, $P_4$. At the appearance of the trailing edge of the shift pulse SP, the states of the triggers $P_1$ through $P_4$ will correspond to the states of the triggers $S_1$ through $S_4$. Now this information remains stored in the punching memory PG for the duration of the next complete machine cycle during which machine cycle the holes must be punched in the cards.

In the punching device described there is a punch for each punching column. The punches M (see FIG. 1) are actuated by electromagnets $M_1$ (FIG. 5c). The moment of energization of an electromagnet by rotating switch $W_7$ determines in which punching position of that column a hole will be punched.

The information stored in the punching memory PG is in the binary code. The numerical punching code, however, is decimal. By means of the code convertor $C_1$ for the first columns of digits (FIG. 5c) the binary code of the punching memory is converted into the desired decimal code. The code converter $C_1$ contains the AND-gates $E_{37}$ through $E_{46}$ operating with negative polarity and the OR-gate $O_2$ operating with negative polarity too.

The output terminals of the triggers $P_1$ through $P_4$ of the punching memory are $I_a$, $I_a'$; $I_b$, $I_b'$; $I_c$, $I_c'$ and $I_d$, $I_d'$, respectively. In the normal state the output terminals $I_a'$, $I_b'$, $I_c'$ and $I_d'$ have negative polarity. The output terminals of the triggers $P_1$ through $P_4$ are so connected to the AND-gates $E_{37}$ through $E_{46}$ that the output terminal of the AND-gate $E_{37}$ assumes negative polarity, if the marking position "0" of the first marking column of a card is marked, since in that case the information contained in the punching memory PG has the binarily coded numerical value "1." Then the output terminals $I_a$, $I_b'$, $I_c'$ and $I_d'$ of the respective triggers $P_1$ through $P_4$ have negative polarity, and these output terminals are the ones then connected to the input terminals of the AND-gate $E_{37}$.

The punching machine contains a switch $W_1$ with a rotary wiper. The wiper rotates synchronously with the appearance of the successive punching positions or rows of numbers g of a card (see FIG. 3) under the punches. When the punching positions "0" are under the punches, the wiper is on the contact 0 of the switch $W_1$. This contact is also connected to an input terminal of the AND-gate $E_{37}$. The wiper has negative polarity. When the wiper is on the contact 0 of switch $W_1$ and the output terminals $I_a$, $I_b'$, $I_c'$ and $I_d'$ have negative polarity, the output terminal of the AND-gate $E_{37}$ has negative polarity too. Then via the OR-gate $O_2$ also operating with negative polarity, this signal is applied to the amplifier $V_{21}$, the output circuit of which contains the electromagnet $M_1$, which is thus energized, and a hole is punched in the punching position "0" of the first punching column.

Similarly if there is a mark in some other marking position in the first marking column, the output terminal of the corresponding AND-gate $E_{38}$ through $E_{46}$ will exhibit negative polarity for the time when its corresponding punching position of the card is under the punch, and the punching of holes in the punching columns 2 through 12 is effected in an analogous way.

Figure 5D:
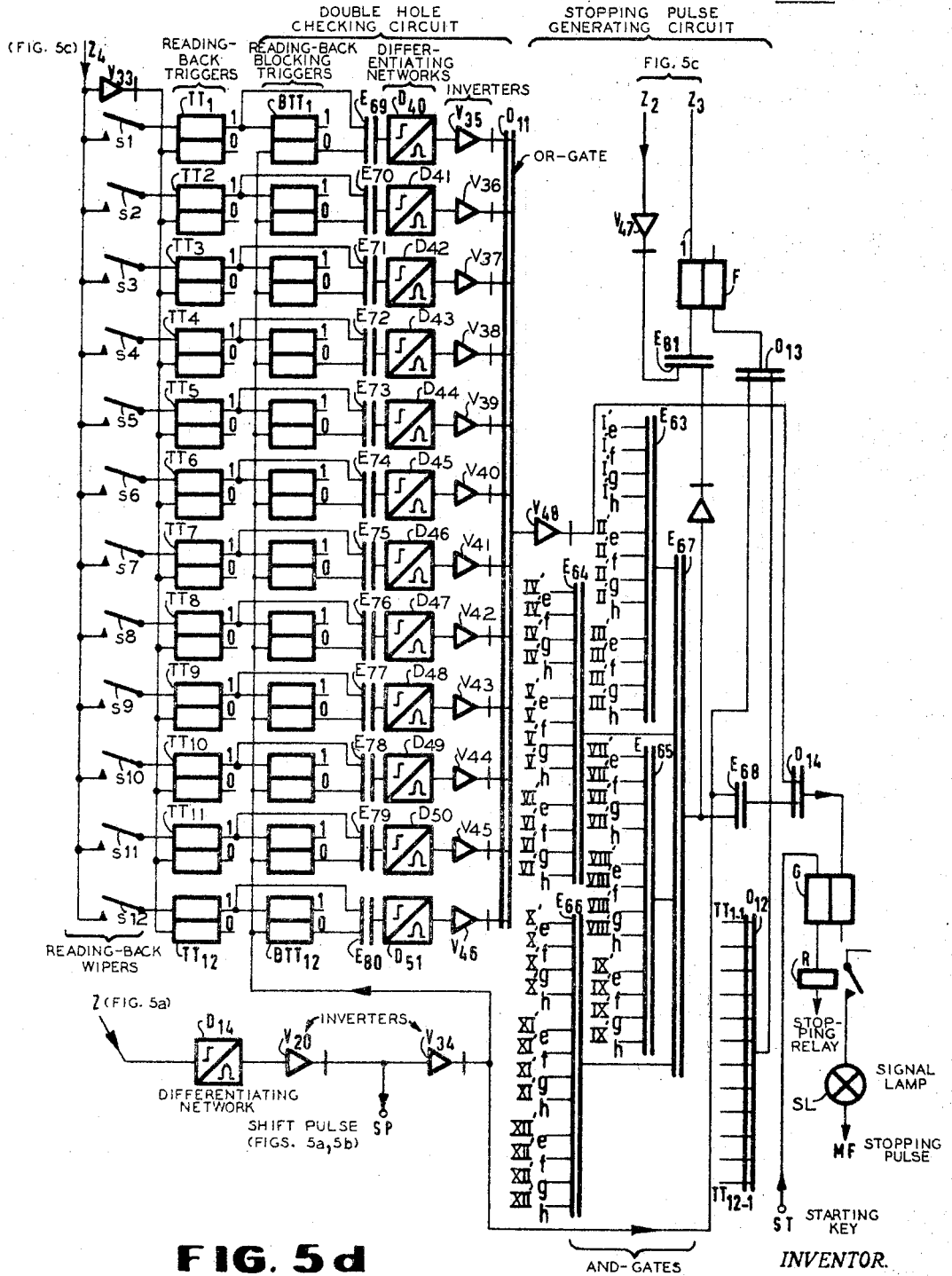

(B-3) Reading back control circuit (FIGS. 4, 5b, and 5d)

(a) Reading back memory IG

After the punching positions "9" of the card have passed the punches M, the next shift pulse SP appears. The information contained in the punching memory PG is then transferred to the reading-back memory TG. Thus the information contained in the punching memory PG of the column and indicated by the states of the triggers $P_1$ through $P_4$, is transferred to the reading back memory triggers $P_5$–$P_8$ (see FIG. 5b). For this purpose the output terminals $I_a$ and $I_a'$ of the trigger $P_1$ are connected to the input terminals of the AND-gates $E_{47}$ and $E_{48}$, respectively, which operate with negative polarity. The shift pulse SP is supplied to the other input terminals of AND-gates $E_{47}$ and $E_{48}$. If during the shift pulse SP the output terminal $I_a$ has negative polarity there appears at the output terminal of the pulse shaping network $D_{25}$, the input terminal of which is connected to the output terminal of AND-gate $E_{48}$, a voltage pulse of positive polarity at the trailing edge of the shift pulse. Via the OR-gate $O_4$, operating with positive polarity, said voltage pulse reaches the input terminal of the trigger $P_5$ of the reading back memory TG. If during the occurrence of the shift pulse SP the output terminal $I_a'$ has negative polarity, a pulse of positive polarity is generated via the AND-gate $E_{47}$, the pulse shaping network $D_{24}$, and the OR-gate $O_3$ to be applied to the other input terminal of the trigger $P_5$. In an analogous way the states of the triggers $P_6$, $P_7$, $P_8$, are caused to correspond to the states of the triggers $P_2$, $P_3$, $P_4$ during the shift pulse SP.

(B-3-b) Counting back pulse CBP generator
(FIGS. 5c and 5d)

The wiper of the rotary switch $W_2$ (see FIG. 5c) rotates synchronously with the wiper of the switch $W_1$ and, consequently with the appearance of the punching positions of a card under the scanning wipers S of the vertifying station d (FIG. 1). The contacts "0" through "9" of the switch $W_2$ are provided with a voltage of positive polarity. Therefore, during the verifying cycle ten voltage pulses of positive polarity will appear at the wiper of the switch $W_2$, these voltage pulses occurring in synchronism with the appearance of the successive punching positions of a card under the wipers of the verifying station. These pulses are called counting-back pulses (CBP). The wiper of the switch $W_2$ is connected to the metal roller m (see FIG. 1) of the reading-back station d. The reading-back wipers $s_1$ through $s_{12}$ (FIG. 5d) make contact with the roller m (FIG. 1), for the time when there is no card under the reading-back wipers and for the time when a punched hole in a card passes a reading-back wiper.

(B-3-c) Reading back and checking triggers
(TT and BTT) (FIG. 5d)

The reading-back wipers $s_1$ through $s_{12}$ are connected to the input terminals of the reading-back triggers $TT_1$ through $TT_{12}$ (FIG. 5d). As the metal roller m only has a positive potential when the wiper of the switch $W_2$ is in connection with one of the contacts 0 through 9, each of the triggers $TT_1$ through $TT_{12}$ can only be changed over if there is a punched hole in the corresponding punching column of a card.

The wiper of the switch $W_2$ is also connected to the input terminal of the inverting amplifier $V_{33}$ (FIG. 5d). The output signal of this amplifier $V_{33}$ is supplied to the other input terminals of the reading-back triggers $TT_1$ through $TT_{12}$. Thus after the passage of each punching position or row, all the reading back triggers $TT_1$ through $TT_{12}$ are restored to normal. Accordingly the passage of a punched hole in a card can only entail one voltage pulse at the output terminal of its relevant trigger TT. Thus an imperfect contact of the reading-back wipers, such as bouncing, is prevented from influencing the verifying circuit.

The output terminals of the reading-back triggers $TT_1$ through $TT_{12}$ are connected to the input terminals of the respective reading-back blocking triggers $BBT_1$ through $BBT_{12}$ (FIG. 5d). The inverted shift pulse is applied to the other input terminals of the reading-back blocking triggers $BTT_1$ through $BTT_{12}$.

If there is a hole in the punching position "0" of the first punching column of a card, the blocking trigger $BTT_1$ will be changed over, when the wiper of the switch $W_2$ is on the contact "0." This blocking trigger $BTT_1$ remains in that state then for the rest of that machine cycle. Correspondingly if there is a hole in some other punching position, the trigger $BTT_1$ is changed over at such a moment that the wiper of the switch $W_2$ is on the contact corresponding to that other punching position.

The other reading-back blocking triggers $BTT_2$ through $BTT_{12}$ are changed over in an analogous way on the appearance of punched holes under the reading-back wipers 2–12, respectively.

(B–3–d) Back counting binary counter $P_5$ through $P_8$ (FIG. 5b)

The counting-back pulses CBP are applied via the AND-gate $E_{82}$ (FIG. 5c) operating with positive polarity to the AND-gate $E_{55}$ (FIG. 5b) operating with negative polarity in the reading-back memory circuit TG. Another input terminal of AND-gate $E_{55}$ is connected to the output terminal $BTT_{1-1}$ of the reading-back blocking trigger $BTT_1$, which output terminal has positive polarity, if that trigger $BTT_1$ has been changed over. The counting-back pulses CBP are also applied to the input terminal of the AND-gate $E_{56}$ which operates with negative polarity and of which another input terminal is connected to the same output terminal $BTT_{1-1}$ of the blocking trigger $BTT_1$. The output terminal $I_e'$ of the memory trigger $P_5$ is also connected to the input terminal of the AND-gate $E_{55}$, and the other output terminal $I_e$ of the same trigger $P_5$ is also connected to the input terminal of AND-gate $E_{56}$. The output terminals of these AND-gates $E_{55}$ and $E_{56}$ are connected to the input terminals of the respective pulse shaping networks $D_{32}$ and $D_{33}$.

If the memory trigger $P_5$ has been changed over, its output terminal $I_e$ has negative polarity. When the first counting-back pulse appears, the pulse shaping network $D_{33}$ delivers a pulse of positive polarity. This pulse is applied via the OR-gate $O_4$ to the input terminal of the memory trigger $P_5$. In case the output terminal $I'_e$ of the trigger $P_5$ has negative polarity when the first counting-back pulse appears, the pulse shaping network $D_{32}$ delivers a pulse of positive polarity, which is applied via the OR-gate $O_3$ to the other input terminal of the memory trigger $P_5$.

Similarly the input terminals of the AND-gates $E_{55}$ through $E_{62}$ are so connected to the output terminals of the triggers $P_5$ through $P_8$ that during the supply of the counting-back pulses to the input terminals of the AND-gates $E_{55}$ and $E_{56}$, the triggers $P_5$ through $P_8$ are arranged with the AND-gates $E_{55}$ through $E_{62}$ and the differentiating or shaping networks $D_{32}$ through $D_{39}$ to operate as a back-counting binary counter. Thus when from the time that the trigger $BTT_1$ has been changed over, the counting-back pulses are blocked at the AND-gates $E_{55}$ and $E_{56}$. Then the proper number of counting-back pulses must have been supplied by that time, so that the triggers $P_5$ through $P_8$ of the reading-back memory of the column 1 are all in their normal states. Furthermore, at the end of the reading-back cycle all the triggers $P_5$ through $P_8$ of the reading-back memories TG of all the other columns 2 through 12 must also be in their normal states.

If e.g., there is a hole in the punching-position "0" of the first punching-column, the memory trigger $P_5$ is changed over at the beginning of the reading-back cycle, and the triggers $P_6$ through $P_8$ remain in their normal states. When the first counting-back pulse CB apears, the pulse shaping network $D_{33}$ will deliver a pulse of positive polarity at its output terminal in the manner described. Via the OR-gate $O_4$ this positive pulse is applied to the input terminal of the memory trigger $P_5$, which is restored to normal as a consequence thereof. Also when this first counting-back pulse CBP appears, there must be a punched hole under the reading-back wiper 1, due to which the trigger $BTT_1$ is changed over. Thus the output terminal $BTT_{1-1}$ of this trigger $BTT_1$, assumes positive polarity, and this voltage blocks the AND-gates $E_{55}$ and $E_{56}$.

(B–3–e) Device stopping circuit

In case there is no hole in the punching-position "0," the trigger $BTT_1$ is not changed over and more than one counting-back pulse CBP will be sent to the reading-back memory TG, so that this memory TG will not be in the normal state at the end of the reading-back cycle. Then this card does not satisfy the condition that the reading-back memories TG must all be in their normal states at the end of the reading-back cycle. This can be checked through a connection of the output terminals $I_e'$ through $I_h'$ for the first column the AND-gate $E_{63}$ (see FIG. 5d) operating with negative polarity. The corresponding output terminals of the triggers of the reading-back memories 2 through 12 are connected to the input terminals of the AND-gates $E_{63}$ through $E_{66}$, the output terminals of which are connected to the AND-gate $E_{67}$ operating with negative polarity. The output terminal of AND-gate $E_{67}$ is connected to the input terminal of the AND-gate $E_{68}$ operating with positive polarity. The other input terminal of AND-gate $E_{68}$ is supplied with the inverted shift pulse obtained from the inverting amplifier $V_{34}$, to the input terminal of which the shift pulse SP is applied. At the output terminal of the AND-gate $E_{68}$ there appears a positive potential, if during the shift pulse SP the reading-back memories TG are not all in their normal states. Fresh information is stored in the reading-back memories TG at the trailing edge of the shift pulse SP; so that then their resetting or counting-back takes place. These during the shift pulse SP all the triggers of all the reading-back memories TG must be and are put in their normal state.

In case the positions and the number of the holes punched on a card do not correspond to the information read by the first reading station, the positive potential appearing at the output terminal of the AND-gate $E_{68}$ is applied via the OR-gate $O_{14}$ to the input terminal of the trigger G, which is then changed over. The output circuit of the trigger G contains the relay R, which is energized when the trigger G is changed over. The energization of this relay R causes a signalling lamp SL to indicate that a machine error has occurred. At the same time the punching device may be automatically stopped by a pulse or the potential MF when this signal appears.

(B–3–f) Double hole checking circuit (FIG. 5d)

By means of the arrangement so far described it cannot be ascertained, whether other holes have been punched in a column beside the hole punched in the desired punching-position of that column. In order to detect whether more than one hole has been punched in the first punching-column of card, the output terminal $BTT_{1-0}$ of the blocking trigger $BTT_1$ (FIG. 5d) is connected to the input terminal of the AND-gate $E_{69}$ operating with negative polarity, the other input terminal of which is connected to the output terminal of the reading back trigger $TT_1$. This output terminal $BTT_{1-0}$ of the blocking trigger $BTT_1$ assumes the negative polarity, when the first hole in the first punching-column of a card appears under the reading-back wiper. After this hole has passed, the output terminal of the AND-gate $E_{69}$ assumes the negative polarity. If another hole appears in the same punching column, the output terminal of the AND-gate $E_{69}$ then becomes positive. This output terminal of AND-gate of $E_{69}$ is connected to the input terminal of the pulse shaping network $D_{40}$, the output terminal of which delivers a positive pulse, when there appears a second hole in a punching column. The output terminal of the shaping network $D_{40}$ is connected to the input terminal of the inverting amplifier $V_{35}$, the output terminal of which, consequently, delivers a negative pulse, when there appears a second hole in a punching-column. Similarly, if in the punching columns 2 through 12 there appears a second hole under a reading-back wiper, the output terminals of the amplifiers $V_{36}$ through $V_{46}$, respectively, delivers a negative pulse. The output terminals of the amplifiers $V_{35}$ through $V_{46}$ are connected to the input terminals of the OR-gate $O_{11}$ operating with negative polarity. The output terminal of OR-gate $O_{11}$ is connected to the input terminal of the inverting amplifier $V_{48}$, the output terminal of which delivers a positive pulse, when there appears more than one hole in one of the punching-columns 1 through 12. Said positive pulse is applied via the OR-gate $O_{14}$ to the trigger G, due to which the punching device stops and the machine error signalling relay R, lamp LS, and pulse MF operate.

(B-4) Operation for erroneously marked unpunched cards

If the marking-column of a card are read as not correctly marked, no holes are punched in that card. In that case all the triggers of the verifying memories IG, PG, and TG are restored to normal in the beginning of the reading-back cycle. If there are no punched holes in a card, ten counting-back pulses CBP will reach the reading-back memory TG so that it will not be in its normal state at the end of the reading period. Therefore, in order to avoid this, the counting-back pulses CBP are suppressed in the case of unpunched cards.

When the wiper of the rotary switch $W_1$ (FIG. 5c) is on the contact 11, the information to be verified is already in the reading-back memories TG; at that moment a positive potential is applied via conductor $Z_2$ to the inverting amplifier $V_{47}$ (FIG. 5d) to the input terminal of the AND-gate $E_{81}$ operating with positive polarity. If at that moment all the triggers of the reading-back memories TG are at normal, this indicates that the card to be scanned in the next reading-back cycle will not contain any holes. In the case of an unpunched card the output terminal of the AND-gate $E_{81}$ assumes positive polarity, so that the trigger F connected to it is changed over. The output terminal $F_1$ of this trigger F thus assumes negative polarity; and this output $F_1$ is connected via conductor $Z_3$ to the input terminal of the AND-gate $E_{82}$ (FIG. 5c) of the counting back pulse CBP generator operating with positive polarity. As a result of the change-over of the trigger F the counting-back pulses CBP which are applied to the reading-back memory TG are suppressed during the scanning of punched cards. Thus reading-back memories TG remain in their normal states.

During the passage of the punching-positions of an unpunched card under the reading-back wipers $s_1$ through $s_{12}$, it is checked whether there are indeed no holes in the punching columns 1 through 12 of that card. The output terminals $TT_{1\text{-}1}$ through $TT_{12\text{-}1}$ of the reading back triggers $TT_1$ through $TT_{12}$ are connected to the input terminals of the OR-gate $O_{12}$ (FIG. 5d) operating with positive polarity. The output terminal of this OR-gate $O_{12}$ is connected via the OR-gate $O_{13}$ operating with positive polarity to the other input terminal of the trigger F. Thus, when there appears a punched hole under one of the reading-back wipers 1 through 12, the trigger F is restored to normal again via the OR-gates $O_{12}$ and $O_{13}$, and the counting-back pulses CBP are supplied again to the reading-back memories TG, due to which these memories TG will not be in their normal states at the end of the verifying cycle, and a machine error will be signalled via trigger G and relay R.

If a card in which no holes must be found exhibits no holes indeed, the trigger F is restored to normal by means of the inverted shift pulse via the OR-gate $O_{13}$ at the end of the verifying cycle.

All the reading back blocking triggers BTT too are restored to normal by means of the inverted shift pulse after the reading-back cycle.

After having indicated a machine error, the trigger G is restored to normal by pressing the starting key ST (FIG. 5d) of the punching device.

In the example described here the cards are led through the punching device in such a postion that all the punching positions having equal numbers are simultaneously under the punches M or under the reading-back wipers S, and the numbers of punches M and reading-back wipers S are equal to the number of punching-columns on the card.

Punching devices are known, however, through which the cards are led in such a position that there is always one punching-column under the punches. In that case the number of punches is equal to the number of punching-positions in one punching-column of a card. The control and verifying circuits described can also be adapted to the latter embodiment of the punching device.

While there is described above the principles of this invention in connection with specific apparatus, it is to be clearly understood that this description is made only by way of example and not as a limitation to this invention.

In the claims:
1. An automatic card punching device comprising:
   (a) means for reading marks on said cards,
   (b) means controlled by said reading means for checking the reading marks for errors,
   (c) means controlled by said checking means for storing correctly read marks,
   (d) means controlled by said reading means for indicating marking errors,
   (e) means controlled by said storing means for punching holes in said card corresponding to said stored marks,
   (f) means controlled by said indicating means for preventing the punching of holes in said card,
   (g) means for reading back said holes punched in said card,
   (h) means controlled by said reading back means for checking said holes with said stored marks, and
   (i) means controlled by said hole checking means for stopping said device when said holes do not correspond to said stored marks and said error indicating means.

2. A device according to claim 1 including means for feeding said cards through said device.

3. A device according to claim 2 wherein said feeding means includes means for generating a shift pulse for controlling said checking means and said storing means.

4. A device according to claim 2 wherein said punching means include a rotary switch controlled by said feeding means.

5. A device according to claim 1 wherein said checking means for said marks includes a binary counter means.

6. A device according to claim 1 wherein said punching means includes a code converter for said marks stored in said storing means.

7. A device according to claim 1 wherein said reading back means includes wiper means for detecting the holes punched in said cards.

8. A device according to claim 1 wherein said hole checking means includes a counting back pulse generator connected to said storing means.

9. A device according to claim 1 wherein said storing means for the read marks includes a binary shift counter.

10. A device according to claim 1 wherein said storing means includes sepaarte memory circuits for operating said punching means and for checking said reading back means.

11. A device according to claim 1 wherein said storing means includes separate sets of storing triggers for said mark reading means, said punching means, and said reading back means.

12. An automatic card punching device comprising:
   (a) means for reading marks on said cards,
   (b) means controlled by said reading means for checking the read marks for errors,
   (c) counting means controlled by said checking means for storing correctly read marks,
   (d) means controlled by said storing means for punching holes in said card corresponding to said stored marks, (e) means for reading back said holes punched in said cards, (f) means controlled by said reading back means for checking said holes with said stored marks, said checking means including means for counting back the numerical position of said holes, and (g) means controlled by said hole checking means for stopping said device when said holes do not correspond to said stored marks.

13. A device according to claim 12 wherein said storage means includes separate trigger means for said mark reading means, said punching means, and said reading back means.

References Cited

UNITED STATES PATENTS

| 2,328,654 | 9/1943 | Lake | 234—34 |
| 3,043,501 | 7/1962 | Pudelko | 234—55 |
| 3,069,075 | 12/1962 | Sallach | 234—34 |

MAYNARD R. WILBUR, *Primary Examiner.*

THOMAS J. SLOYAN, *Assistant Examiner.*

U.S. Cl. X.R.

234—55; 235—61.1, 61.7

UNITED STATES PATENT OFFICE
CERTIFICATE OF CORRECTION

Patent No. 3,436,010                                                      April 1, 1969

Arie Adriaan Spanjersberg

It is certified that error appears in the above identified patent and that said Letters Patent are hereby corrected as shown below:

Column 2, line 57, "wipers" should read -- wiper s --. Column 4, line 22, "to" should read -- through --; line 75, after "pulse" insert -- in conductor TP --. Column 5, line 5, "stripes b" should read -- stripes f --; line 33, cancel "through", first occurrence; line 40, "TP" should read -- PT, --; line 45, "resorting" should read -- restoring --; line 60, after "pulse" insert -- SP --. Column 7, line 9, "switch $W_7$" should read -- switch $W_1$ --. Column 9, line 58, "apepars" should read -- appears --. Column 10, line 6, after "column" insert -- to --; line 24, "These" should read -- Thus --. Column 12, line 60, "sepaarte" should read -- separate --.

Signed and sealed this 21st day of April 1970.

(SEAL)
Attest:

EDWARD M. FLETCHER, JR.                            WILLIAM E. SCHUYLER, JR.
Attesting Officer                                          Commissioner of Patents